United States Patent Office 2,928,723
Patented Mar. 15, 1960

2,928,723

PROCESS FOR MAKING BASIC CHROMIC CHLORIDES

Tom S. Perrin and Robert G. Banner, Painesville, Ohio, assignors to Diamond Alkali Company, Cleveland, Ohio, a corporation of Delaware No Drawing. Application August 23, 1956
Serial No. 605,722

7 Claims. (Cl. 23—87)

This invention relates to chemical compositions and to a method of preparing them. The invention relates more particularly to compositions of basic chromic chlorides and to a process for preparing them.

Chromic chloride, $CrCl_3.6H_2O$, has heretofore been prepared commercially as a crystalline product. The crystalline product, however, is difficult to prepare and is an expensive source of soluble trivalent chromium. As a consequence, several methods have been proposed for the preparation of less expensive soluble trivalent chromic chlorides. One such method generally involves the reaction between chromic acid ($CrO_3$) and excess hydrochloric acid in solution. Since the chromic chloride resulting from this reaction is in solution, in order to obtain a solid product it is necessary to dry the material. The use of a large excess of hydrogen chloride required for this reaction is undesirable because of its expense and the nature of the reaction. Thus, when aqueous solutions of chromic chloride are spray dried, difficulties are encountered because of the corrosivity of the gases released during the drying step. Such gases, and specifically hydrogen chloride, released during the drying operation, cause severe corrosion of the equipment at the temperatures required for the preparation of the dry product. In addition to the problem of corrosivity during spray drying operations, the preparation of chromic chloride by the reaction of chromic acid with hydrogen chloride is attended by a series of undesirable side reactions which result in loss of chlorine, formation of chromyl chloride and, additionally, loss of $CrO_3$.

An object of this invention therefore is the preparation of soluble basic chromic chlorides which are less expensive to prepare and wherein loss of reactants and reaction products is substantially avoided.

A further object of this invention is the preparation of a series of soluble basic chromic chlorides which are less corrosive to drying equipment, are less hydroscopic and have a higher bulk density than prior art chromic chlorides.

These and other objects will become apparent from the description of the invention to follow. In accordance with this invention, it has been found that a series of soluble basic chromic chlorides can be prepared by reducing a hexavalent chromium salt by a process comprising the steps of forming an aqueous solution of said salt, adding a quantity of an organic reducing agent in an amount insufficient to cause the solution to gel and thereafter adding the remainder of the organic reducing agent and hydrogen chloride. The solutions of basic chromic chloride prepared by this process are thereafter spray dried to obtain a series of basic chromic chlorides which have the advantageous properties of having a high bulk density, being less corrosive to drying equipment, less hydroscopic than normal chromic chlorides, and completely soluble in water.

Exemplary of the reactants that are employed in the process of this invention for the preparation of soluble basic chromic chlorides are hexavalent chromium salts such as chromic acid and alkali metal bichromates. The organic reducing agents employed in the process of this invention include reducing sugars such as the mono- and polysaccharides, and the various polyhydroxy compounds such as glycerine and the like. Glucose is the preferred polyhydroxy organic reducing agent because of its low cost and ready availability. Concentrated hydrochloric acid is preferred for preparing soluble basic chromic chloride although it should be understood that dilute solutions are also within the scope of this invention.

The soluble basic chromic chlorides of this invention are prepared generally by varying the proportions of the reactants depending on the basicity of the product desired. In general, a stoichiometric proportion of hydrogen chloride is required for the preparation of normal chromic chloride solutions. The ratio of hydrogen chloride to the chromium salt, however, determines the degree of basicity of the chromic chloride and, therefore, by reducing the quantity of hydrogen chloride the theoretical basicity of the product is increased. An approximate estimation of the basicity of the chromic chloride solution is determined by the formula: percent basicity=(1-ml. conc. HCl/990 ml.) 100, for the reaction involving 400 grams of chromic acid with concentrated hydrogen chloride (37%) and 120 grams of glucose, and percent basicity=(1-ml. conc. HCl—330 ml./990 ml.) 100, for the reaction involving 596 grams of sodium bichromate, concentrated hydrogen chloride and 120 grams of glucose. The larger quantity of sodium bichromate used in this reaction is due to the fact that the chromium content of sodium bichromate is less than that of chromic acid. It should be mentioned that in this formula 330 ml. of concentrated hydrogen chloride react to form sodium chloride. It should be understood that the formulae shown above are intended only as a guide of the approximate basicity of the solution and are not intended as limiting the invention since other methods can be used to determine the theoretical basicity of the solution more accurately. By the process of this invention a series of soluble basic chromic chlorides are prepared ranging in theoretical basicity from 0% to 80% as indicated by the formulae shown above. It should be noted that in the formulae, the stoichiometric amount of hydrogen chloride required for the reaction involving the amounts of hexavalent chromium indicated above, for a theoretical basicity of 0% is 990 ml. of concentrated hydrochloric acid. As noted, therefore, by reducing the quantities of the acid, various degrees of basic chromic chlorides can be prepared.

Generally, the amount of glucose employed in the reaction can vary; however, it is employed in an amount sufficient to substantially reduce the hexavalent chromium to the trivalent state. For chromic chloride solutions where chromic acid is used, a ratio by weight of chromic acid to glucose of 4:1.2 is employed, while where sodium bichromate is used, the ratio by weight of sodium bichromate to glucose is 6:1.2. Glucose can be employed in excess, if desired, but with little advantage, if any, resulting.

The preparation of soluble basic chromic chlorides, according to the process of this invention, involves first, forming an aqueous solution of hexavalent chromium with an amount of glucose insufficient to cause the solution to gel or foam excessively, and thereafter slowly adding the remainder of the glucose in solution with hydrogen chloride at a rate sufficient to prevent excessive foaming. The amount of glucose added to the aqueous solution of hexavalent chromium before it begins to gel or harden should be below about 66% of the total amount used in the reaction. Good results are obtained by adding from about 10 to 66% of the glucose to the hexavalent chromium solution although the addition of about 50% of glucose is preferred. It has been discovered that by this process, optimum results are obtained and there is no noticeable loss of HCl, $CrO_3$ or formation of $CrO_2Cl_2$ and $Cl_2$ as would result by mixing the reactants in any other order. The series of basic chromic chlorides obtained by this method are thereafter spray dried and it is found that they lose a minimum amount of corrosive gases, e.g., hydrogen chloride, and also yield a less hygroscopic and denser product. The spray dried powders of this invention are all completely soluble in water and provide a ready source of inexpensive trivalent chromium. In addition, as will be brought out hereinafter, the powders are soluble in other solvents thus adapting them for special uses.

In order that the invention be more fully understood by those concerned, reference is made to the following examples.

EXAMPLE I

A chromic chloride solution is prepared by dissolving 400 gms. of $CrO_3$ flakes in 1000 ml. of water and placing in a flask with an agitator and reflux condenser. To this mixture there is then added 50 gms. of glucose in 100 ml. of water as quickly as possible without excessive foaming, i.e., about 10 minutes. Thereafter, 70 gms. of glucose in 140 ml. of water are added to 990 ml. of concentrated hydrochloric acid (37% HCl) and mixed thoroughly. The glucose and HCl mixture is then slowly added to the flask at a rate sufficient to prevent excessive foaming, i.e., for a period of about 45 minutes. The contents are then heated for 30 minutes to complete the reaction. The reduction of hexavalent chromium to the trivalent form is complete as determined by testing for hexavalent chromium with hydrogen peroxide and ether. During the reaction, there is no noticeable loss of HCl, $CrO_3$ or formation of $CrO_2Cl_2$ or $Cl_2$. The chromic chloride prepared in this example is spray dried, analyzed and the following is obtained: $CrCl_3$—91.5% with a loss on ignition of 4.02% at 125°. The solid is 18.2% basic as calculated from the Cl:Cr ratio (determined by analysis) which accounts for the product not totaling 100%. Loss of hydrogen chloride during spray drying accounts for the increase in basicity of 0 to 18.2% after drying.

EXAMPLE II

Part A

The reproduceability of this method of preparing chromic chlorides is demonstrated by preparing two additional batches of the product using the procedure of Example I, spray drying all under the same conditions, and analyzing for Cl:Cr uniformity. The three products are found to contain a Cl:Cr ratio of 1.67 and an 18.2% basicity thereby demonstrating that the method of preparing the chromic chloride is reproduceable.

Part B

A batch of chromic chloride prepared by reducing chromic acid with hydrochloric acid (25% excess HCl required to complete the reduction) is also found to contain a Cl:Cr ratio of 1.67. However, the reaction is accompanied by formation of chlorine, chromyl chloride and loss of $CrO_3$. Furthermore, the large quantities of hydrogen chloride liberated during the spray drying operation (about 25%) cause severe corrosion of the equipment.

EXAMPLE III

Crude chromic acid crystals are used to prepare a chromic chloride solution by following the same procedure as in Example I. The crude chromic acid analyzes: 79.3% $CrO_3$, 8.2% $NaHSO_4$ and 4.7% $H_2SO_4$ and the remainder water. In this example, 505 gms. of crystals (containing 400 gms. of $CrO_3$) are reduced with 120 gms. of glucose in the presence of 928 ml. of concentrated HCl. The product is spray dried and found to contain 83.7% $CrCl_3$, 1.16% Na, 7.64% $SO_4$ and a loss on ignition of 3.91% at 125°. The material is 19.0% basic (due to loss of HCl during spray drying) as calculated from the Cl:Cr ratio (determined by analysis) which accounts for the analysis not totaling 100%. This example demonstrates that the crude chromic acid is applicable in the process of this invention.

EXAMPLE IV

Chromic chloride is prepared from sodium bichromate by dissolving 596 gms. of $Na_2Cr_2O_7.2H_2O$ in one liter of water and placing in a flask with a stirrer and condenser. The $Na_2Cr_2O_7.2H_2O$ solution is heated to about 80° C. and 60 gm. of glucose are added at a rate sufficient to prevent gelling or excessive foaming followed by adding the remainder of the glucose with concentrated hydrogen chloride. The solution is heated for about 5 hours to complete the reaction. In this example, 1320 ml. of concentrated HCl and 120 gms. of glucose are employed. A sample of the chromic chloride prepared as above is analyzed and the following is found: 67.6% $CrCl_3$, 25.4% NaCl and a loss on ignition of 6.16% at 125° C. The material is 19.2% basic after spray drying (due to loss of HCl) as calculated from the Cl:Cr ratio (determined by analysis) which accounts for the total not being 100%.

EXAMPLE V

By the procedure outlined in Example I, a series of chromic chloride solutions of varying degrees of theoretical basicity are prepared by controlling the amount of hydrochloric acid employed. This is shown in Table I below.

TABLE I

| Basicity of Solution, Percent | Grams $CrO_3$ | Ml. Conc. HCl | Grams Glucose | Percent Excess Glucose |
| --- | --- | --- | --- | --- |
| 0 | 400 | 990 | 120 | 0.0 |
| 20 | 400 | 791 | 120 | 0.0 |
| 40 | 400 | 594 | 122.5 | 1.9 |
| 66 | 400 | 336 | 140 | 16.7 |
| 75 | 400 | 247 | 140 | 16.7 |
| 80 | 400 | 198 | 147.5 | 23.0 |

EXAMPLE VI

By the procedure outlined in Examples I and IV, a series of chromic chloride solutions of varying degrees of theoretical basicity are prepared from sodium bichromate by controlling the amount of hydrochloric acid employed. This is shown in Table II below.

TABLE II

| Basicity of Solution, Percent | Grams $Na_2Cr_2O_7.2H_2O$ | Ml. Conc. HCl | Grams Glucose | Percent Excess Glucose |
| --- | --- | --- | --- | --- |
| 0 | 596 | 1,320 | 120 | 0.0 |
| 50 | 596 | 825 | 127.5 | 6.3 |
| 73 | 596 | 597 | 130 | 8.3 |

In the examples prepared in Tables I and II above, there is noticeable loss of CHl, $CrO_3$ or formation of $Cl_2$ and $CrO_2Cl_2$.

Although the preparation of basic chromic chloride by the reduction of $Na_2Cr_2O_7.2H_2O$ is the least expensive for the products of this invention, the reaction is accompanied by the production of sodium chloride to the extent of from 25–29% total solids in the final product. The product is satisfactory for uses where these quantities of sodium chloride are not objectionable. Where a purer product is required, the sodium chloride content can be satisfactorily reduced by removing with acetone. A procedure for this operation is described below.

EXAMPLE VII

A normal chromic chloride solution prepared with sodium bichromate as in Example IV is concentrated to a specific gravity of 1.36 and filtered. 50 ml. of the mother liquor is then mixed with varying amounts of acetone as shown in Table III below. The mixture is cooled and held at 5° C. for 48 hours. After this, the sodium chloride crystals are filtered and the filtrate analyzed for chromium and sodium chloride.

TABLE III

| Ml. of CrCl₃ Solution | Ml. of Acetone | Percent NaCl in filtrate (basis: total solids in filtrate) |
|---|---|---|
| 50 | 0 | 7.77 |
| 50 | 5 | 6.92 |
| 50 | 10 | 6.15 |
| 50 | 15 | 5.84 |
| 50 | 25 | 4.62 |

From the above, it is seen that acetone can be used to reduce the amount of sodium chloride from the solution of basic chromium chlorides prepared from the sodium bichromate-glucose reaction. Larger amounts of acetone can be used, however, optimum removals of sodium chloride are accomplished with the last ratio indicated in the second column above.

The desirable and advantageous properties of the basic chromic chlorides of this invention are demonstrated by spray drying several solutions prepared as in the examples given above. In spray drying the solutions, a Bowen Laboratory spray drier is employed with the following set of low and high temperature conditions. Thermo regulator setting 800° F.–1000° F., inlet temperature 680° F.–750° F., upper wall temperature 420° F.–490° F., outlet temperature 255° F.–310° F.

Table IV below shows spray drying data for the various chromic chloride solutions prepared in accordance with Examples I and V.

TABLE IV

| Basicity of Solution, Percent | Basicity of Product, Percent (Cl:Cr ratio) | Percent HCl Loss | Color |
|---|---|---|---|
| 0 [1] | 18.6 | 18.6 | Pink. |
| 0 [2] | 25.6 | 25.6 | Do. |
| 20 | 26.8 | 8.5 | Do. |
| 40 | 42.4 | 4.0 | Green. |
| 66 | 66.2 | 0.58 | Do. |
| 73 [3] | 73 | 0 | Do. |
| 75 | 74.7 | 0 | Do. |
| 80 | 79.4 | 0 | Do. |

[1] Spray dried at high temperature setting.
[2] Prepared by reducing chromic acid with concentrated HCl.
[3] Prepared from sodium bichromate.

From Table IV above, it should be noted that the normal chromic chloride solutions spray dried at high and low temperature settings result in a loss of 25.6 and 18.5% HCl, respectively. This loss of HCl in the equipment results in severe spray dryer corrosion. Note, however, the striking difference in loss of HCl in the powders prepared from the 20% basic solution and higher as shown in the table. These powders are less hygroscopic than the normal chromic chloride products and have a higher bulk density. The higher basicity solutions not only lose little or no HCl but they can be dried at lower temperature settings. The spray dried powders of Table IV are completely soluble in water.

The basic chromic chlorides of this invention find many uses, an example being as tanning agents in the leather industry. In leather tanning, the basic chromic chlorides can be employed in solution with solvents, for example, methanol. It is found that the 20, 40 and 50% basic solutions prepared from chromic acid and from sodium bichromate are readily soluble in methanol to the extent required in tanning solutions (or to a greater extent). In general, therefore, the lower basicity salts, i.e., 50%, 40% and lower, have the required solubility in methanol for use in tanning solutions. The higher basicity salts are not as readily soluble in the methanol, however, such solutions containing small proportions of sodium chloride, are, after spray drying, also soluble to the extent required. Table V below illustrates the solubility of a 40% basic chromic chloride of this invention in various solvents as compared to commercial $CrCl_3.6H_2O$.

TABLE V

| Solute | Percent Cr | Solvent | Percent H₂O added; basis sample weight | Grams Cr dissolved/ 100 grams solvent |
|---|---|---|---|---|
| $CrCl_3.6H_2O$ | 19.5 | Methanol | | 39.8 |
| $CrCl_3.6H_2O$ | 19.5 | Ethanol | | 22.4 |
| $CrCl_3.6H_2O$ | 19.5 | Isopropanol | | 11.3 |
| $CrCl_3.6H_2O$ | 19.5 | Acetone | | 11.9 |
| 40% basic chromic chloride | 27.5 | Methanol | 0.0 | 97.3 |
| Do | 27.5 | do | 20.8 | 109 |
| Do | 27.5 | Ethanol | 0.0 | 24.7 |
| Do | 27.5 | do | 20.8 | 53.4 |
| Do | 27.5 | Isopropanol | 0.0 | 14.3 |
| Do | 27.5 | do | 20.8 | 27.3 |
| Do | 27.5 | Acetone | 0.0 | 20.7 |
| Do | 27.5 | do | 20.8 | 36.5 |

Although this invention has been described with reference to soluble basic chromic chlorides, their uses and methods of preparing them, it is intended to cover all modifications that fall within the spirit of the invention and the scope of the appended claims.

What is claimed is:

1. A process for preparing soluble basic chromic chlorides by reducing a soluble hexavalent chromium compound, comprising the steps of forming an aqueous solution of said compound, adding a quantity of polyhydroxy organic reducing agent in an amount insufficient to cause the solution to gel, said amount being less than about 66% of that required to reduce the hexavalent chromium to the trivalent state, adding the remainder of the organic reducing agent, and hydrogen chloride, and thereafter spray drying said solution.

2. A process for preparing soluble basic chromic chlorides comprising the steps of forming an aqueous solution of chromic acid, adding a quantity of polyhydroxy organic reducing agent in an amount insufficient to cause the solution to gel, said amount being less than about 66% of that required to reduce the hexavalent chromium to the trivalent state, adding the remainder of the organic reducing agent, and hydrogen chloride in an amount up to the stoichiometric amount required to form chromic chloride, and thereafter spray drying said solution.

3. A process for preparing soluble basic chromic chlorides which comprises the steps of forming an aqueous solution of an alkali metal bichromate, adding a quantity of a polyhydroxy organic reducing agent in an amount insufficient to cause the solution to gel, said amount being less than about 66% of that required to reduce the hexavalent chromium to the trivalent state, adding the remainder of the organic reducing agent, and hydrogen chloride in an amount up to the stoichiometric amount required to form chromic chloride, and thereafter spray drying said solution.

4. A process for preparing a soluble basic chromic chloride salt which comprises the steps of forming an aqueous solution of a hexavalent chromium compound, adding a quantity of a reducing sugar in an amount insufficient to cause the solution to gel, said amount being less than about 66% of that required to reduce the hexavalent chromium to the trivalent state, adding the remainder of the reducing sugar in solution with hydrochloric acid, the hydrogen chloride in said acid being an amount up to the stoichiometric amount required to form chromic chloride, and thereafter spray drying said solution.

5. A process according to claim 4 wherein the hexavalent chromium compound is chromic acid.

6. A process according to claim 4 wherein the hexavalent chromium compound is alkali metal bichromate.

7. A process according to claim 4 wherein the reducing sugar is glucose.

References Cited in the file of this patent

UNITED STATES PATENTS

| | | |
|---|---|---|
| 2,273,040 | Iler | Feb. 17, 1942 |
| 2,470,378 | Skala | May 17, 1949 |
| 2,523,803 | Iler | Oct. 10, 1950 |

OTHER REFERENCES

Thorpe: "Dictionary of Applied Chemistry," 4th ed., vol. VII, page 559; publ. by Longmans, Green and Co., N.Y., 1946.

UNITED STATES PATENT OFFICE

CERTIFICATE OF CORRECTION

Patent No. 2,928,723            March 15, 1960

Tom S. Perrin et al.

It is hereby certified that error appears in the printed specification of the above numbered patent requiring correction and that the said Letters Patent should read as corrected below.

Column 1, lines 51 and 68, for "hydroscopic", each occurrence, read -- hygroscopic --; column 4, line 63, for "is noticeable loss of CHl," read -- is no noticeable loss of HCl, --; column 6, line 49, for "of polyhydroxy" read -- of a polyhydroxy --.

Signed and sealed this 23rd day of August 1960.

(SEAL)
Attest:

KARL H. AXLINE
Attesting Officer

ROBERT C. WATSON
Commissioner of Patents